United States Patent
Liu

(10) Patent No.: US 10,907,691 B2
(45) Date of Patent: Feb. 2, 2021

(54) SPEED DIFFERENTIAL DEVICE OF DOUBLE OVERRUNNING CLUTCH DEVICE

(71) Applicant: Jen-Chih Liu, Hsinchu (TW)

(72) Inventor: Jen-Chih Liu, Hsinchu (TW)

(73) Assignee: NEW KAILUNG GEAR CO., LTD., Kaohsiung (TW)

( * ) Notice: Subject to any disclaimer, the term of this patent is extended or adjusted under 35 U.S.C. 154(b) by 127 days.

(21) Appl. No.: 16/262,939

(22) Filed: Jan. 31, 2019

(65) Prior Publication Data

US 2020/0248751 A1    Aug. 6, 2020

(51) Int. Cl.

| | |
|---|---|
| *F16H 48/12* | (2012.01) |
| *B60K 23/08* | (2006.01) |
| *F16D 3/10* | (2006.01) |
| *F16D 41/00* | (2006.01) |
| *F16D 3/50* | (2006.01) |
| *F16D 27/00* | (2006.01) |

(52) U.S. Cl.
CPC .............. *F16D 3/10* (2013.01); *B60K 23/08* (2013.01); *F16D 3/50* (2013.01); *F16D 41/00* (2013.01); *F16H 48/12* (2013.01); *F16D 2027/005* (2013.01)

(58) Field of Classification Search
CPC ....... B60K 23/08–2023/0891; F16H 48/12–19
See application file for complete search history.

(56) References Cited

U.S. PATENT DOCUMENTS

| | | | | |
|---|---|---|---|---|
| 2003/0234130 A1* | 12/2003 | Handa | ............... | B60K 23/08 180/247 |
| 2007/0163854 A1* | 7/2007 | Irikura | ............... | F16H 48/19 192/50 |
| 2014/0141920 A1* | 5/2014 | Creager | ............... | F16H 48/19 475/220 |
| 2015/0159743 A1* | 6/2015 | Palmer | ............... | F16D 47/04 74/650 |
| 2018/0038425 A1* | 2/2018 | Kimes | ............... | B60K 17/06 |

* cited by examiner

*Primary Examiner* — Ernesto A Suarez
*Assistant Examiner* — Lillian T Nguyen

(57) ABSTRACT

A speed differential device of a double overrunning clutch device includes: a left input unit, an left output ring with cam, a right input unit, a right output ring with a cam; and double overrunning clutch device between the left output ring and the right output ring. The double overrunning clutch device includes a left clutch unit and a right clutch unit; and a synchronous unit is installed between the left clutch unit and the left output ring, and between the right clutch unit and the right output ring. The synchronous unit has a left synchronous ring and a right synchronous ring, but rotate independently; an inner surface of each of the left synchronous ring and the right synchronous ring is formed with teeth or tilt teeth; and an outer annular surface of each of the left synchronous ring and right synchronous ring is formed with teeth or tilt teeth.

5 Claims, 9 Drawing Sheets

SPEED DIFFERENTIAL DEVICE OF DOUBLE OVERRUNNING CLUTCH DEVICE

FIELD OF THE INVENTION

The present invention is related to clutch devices, and in particular to a speed differential device of a double overrunning clutch device.

BACKGROUND OF THE INVENTION

General a speed differential device is installed with a clutch unit which is used to switch the moving forwards and backwards in movement of a car such as those described in U.S. Pat. No. 5,971,123, an inner annular surface of a power input unit of a clutch device is installed with a cam which not only affect the strength of an outer ring thererof, but also reduce the bearing ability of the outer ring.

Moreover, disposition of left and right rolling posts of the speed differential device causing that the wheels are locked cannot be prevented. Because the transient acceleration, deceleration, and speed reduction in moving forwards and backwards of the speed differential structure, the rotation inertia of the speed differential device will induce that in switching operation, the rolling posts of the clutch device moves through an extend over the displacement in opposite direction. Therefore, it is possible that the rolling posts are deadly buckled, and an asynchronous operation occurs. As a result the wheels at that side are deadly locked. The prior art serves to improve above mentioned defects, but as a result, the structure is complicated, the cost is high, the weight is heavy and time for assembling is long.

However, the main problem is to design a speed differential device for a clutch device to have higher bearing ability and higher strength. Furthermore, it is desired to have a novel design which can resolve the deadly locking of the double overrunning clutch device due to the rotation inertia and asynchronous operations from transient forward or backward accelerations and deceleration.

SUMMARY OF THE INVENTION

In summary, the speed differential device for a double overrunning clutch device of the present invention has the following advantages:

1. The speed differential device of a double overrunning clutch device has a greater strength and bearing ability.
2. A cam is installed to the output ring. The speed differential device with a cam can prevent that the speed differential device to be locked due to the transient acceleration, deceleration, and seed reduction in moving forwards and backwards of the speed differential device. Therefore, the present invention provides a safety structure.
3. The structure of the present invention is simple, concrete, and novel.

To achieve above object, the present invention provides a speed differential device of a double overrunning clutch device, comprising: a left input unit (1), an left output ring (10) with cam, a right input unit (2), a right output ring (20) with a cam; and double overrunning clutch device between the left output ring (10) and the right output ring (20); wherein the double overrunning clutch device includes a left clutch unit (3) and a right clutch unit (4); and a synchronous unit (5) is installed between the left clutch unit (3) and the left output ring (10), and between the right clutch unit (4) and the right output ring (20).

The synchronous unit (5) has a left synchronous ring (51) and a right synchronous ring (52) which are combined together, but can rotate independently; an inner surface of each of the left synchronous ring (51) and the right synchronous ring (52) is formed with teeth or tilt teeth; and an outer annular surface of each of the left synchronous ring (51) and right synchronous ring (52) is formed with teeth or tilt teeth.

The left clutch unit (3) includes an left outer ring (31), a left middle ring (32), at least one rolling post (33), a left rolling post retainer (34) at a front end of the left output ring (10) and the left output ring (10) with a cam; and the right clutch unit (4) includes a right outer ring (41), a right middle ring (42), at least one rolling post (43), a right rolling post retainer (44) installed at a front end of the right output ring (20); and the right output ring (20) with the cam; the left middle ring (32) and the right middle ring (42) are connected together by a bearing (6), but they are rotatable independently; an outer surface of the left middle ring (32) is formed with teeth (321) for engaging with left rolling post retainer (34) and an outer surfaces of the right middle ring (42) is formed with teeth (421) for engaging with the right rolling post retainer (44); an inner surface of the left middle ring (32) is formed with tilt teeth (322) for engaging with the outer tilt teeth (512) of the left synchronous ring (51); and an outer surfaces of the right middle ring (42) is formed with tilt teeth (422) for engaging with the outer tilt teeth (522) of the right synchronous ring (52).

The left output ring (10) is installed with a cam (101); a front end of the left output ring (10) is assembled with the left rolling post retainer (34); an annular wall of the left rolling post retainer (34) is formed with at least one penetrating notch (341) for receiving the rolling posts (33); an inner annular wall at a front end of the left rolling post retainer (34) is formed with teeth (342) for engaging with the teeth at an outer annular surface of the left middle ring (32); an outer side at a front end of the left output ring (10) is installed with a teeth (11) for engaging with an inner annular teeth (511) of the left synchronous ring (51); and the right output ring (20) is installed with a cam (201); a front end of the right output ring (20) is assembled with a right rolling post retainer (44); an annular wall of the right rolling post retainer (44) is installed with at least one penetrating notches (441) for locating the rolling posts (43); an inner annular wall at a front end of the right rolling post retainer (44) is formed with teeth (442) for engaging the teeth (421) at the outer annular of the right middle ring (42); an outer side at a front end of the right output ring (20) is formed with teeth (21) for engaging with the inner annular teeth (521) of the right synchronous ring (52).

A damping unit (7) is installed between the left outer ring (31) and the left rolling post retainer (34); another damping unit (7) is installed between the right outer ring (41) and the right rolling post retainer (44); the damping units (7) are positioned and assembled between the left outer ring (31) and the left rolling post retainer (34) and between the right outer ring (41) and the right rolling post retainer (44). The damping unit (7) is selected from one of a friction sheet, a spring, or a magnetic element.

The left clutch unit (3) includes a left outer ring (31) and at least one rolling posts (33), a left rolling post retainer (34) at a front end of the left output ring (10), and the left output ring (10); the right clutch unit (4) includes a right outer ring (41), at least one rolling posts (43), a right rolling post retainer (44) at a front end of the right output ring (20) and the right output ring (20); an annular wall of the left rolling post retainer (34) is formed with at least one notch (341) for locating the rolling posts (33); an inner annular wall (343) at a front end of the left rolling post retainer (34) is formed with tilt teeth (343) for engaging with the outer annular tilt teeth (412) of a left synchronous ring (51) of a synchronous unit (5); an annular wall of the right rolling post retainer (44) is formed with at least one notch (441) for locating the rolling posts (43); an inner annular wall of the right rolling post retainer (44) is installed with tilt teeth (443) for engaging with an outer annular tilt teeth (522) of the right synchronous ring (52).

An inner annular surface of the left middle ring (32) and an inner annular surface of the right middle ring (42) are formed with teeth.

The teeth on the outer side of the axial front end of the left output ring (10) are tilt teeth and the teeth at an outer side of the axial front end of the right output ring (20) are tilt teeth.

DETAILED DESCRIPTION OF THE INVENTION

Figure 1:
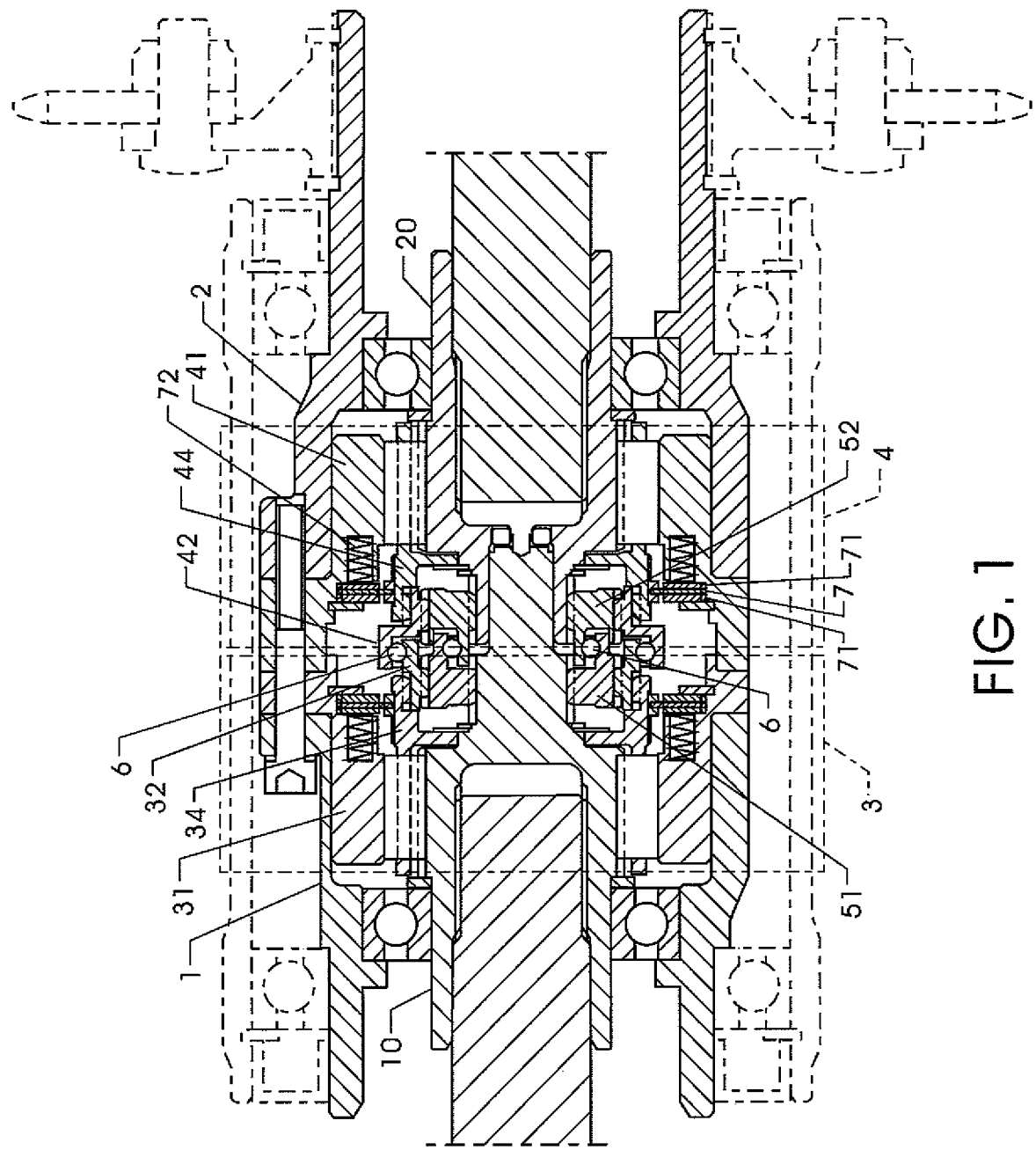
FIG. 1 shows the first embodiment of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 16, the embodiments of the present invention are illustrated. Different embodiments have identical technology, identical object, and identical effect. The speed differential device of these embodiments includes a left input unit 1, an left output ring 10 with a cam, a right input unit 2, a right output ring 20 with a cam; and double overrunning clutch device between the left output ring 10 and the right output ring 20. The double overrunning clutch device includes a left clutch unit 3 and a right clutch unit 4. A synchronous unit 5 is installed between the left clutch unit 3 and the left output ring 10, and between the right clutch unit 4 and the right output ring 20.

Figure 2:
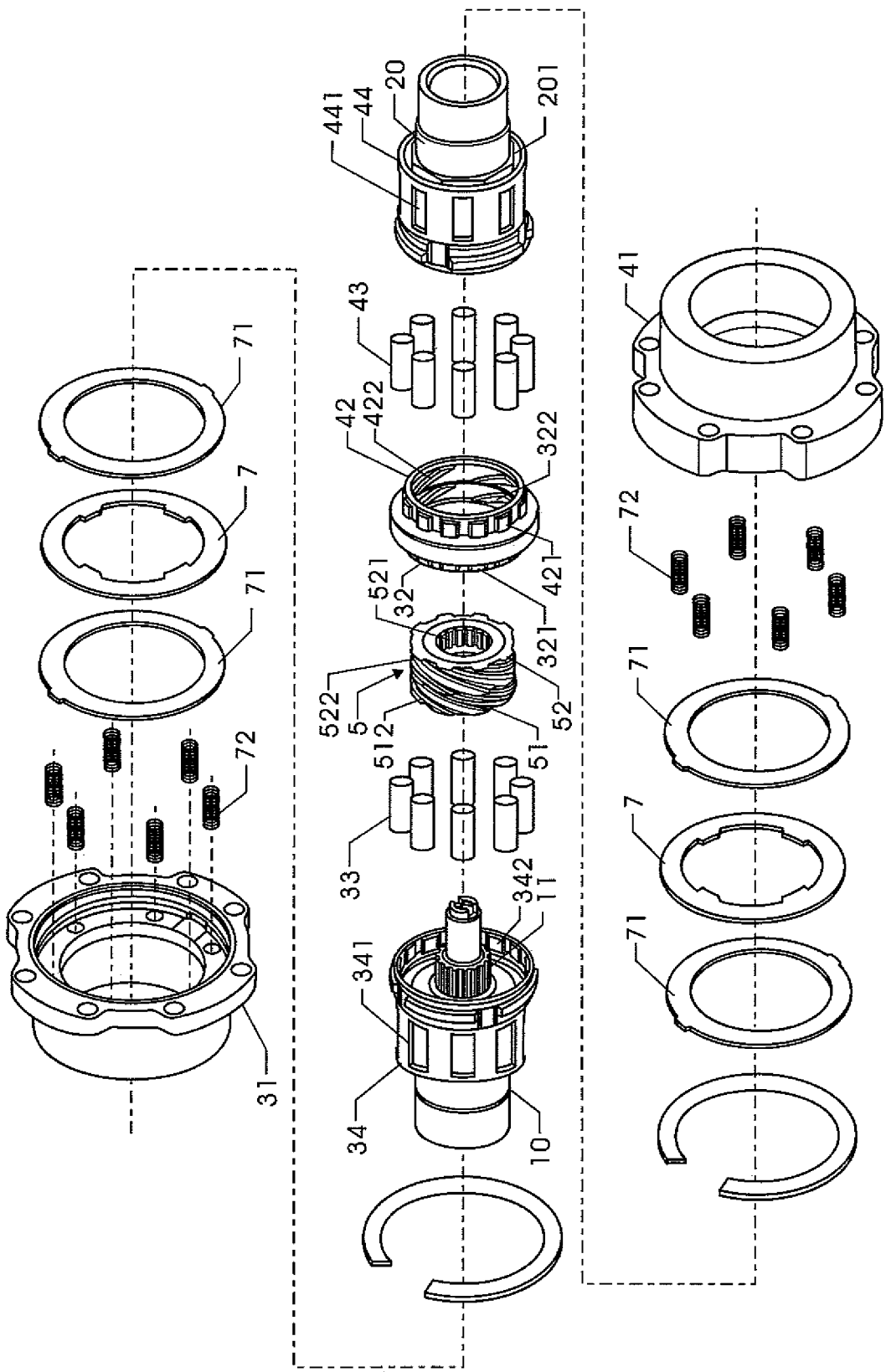
FIG. 2 is an assembled schematic view about the double overrunning clutch device in the first embodiment of the present invention.
Figure 3:
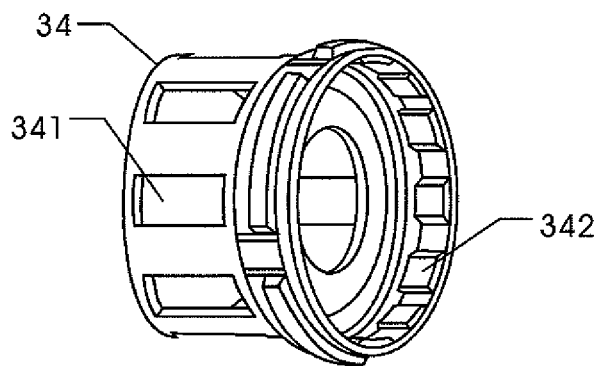
FIG. 3 shows the left rolling post retainer in the front end of the left output ring according to the first embodiment of the present invention.
Figure 4:
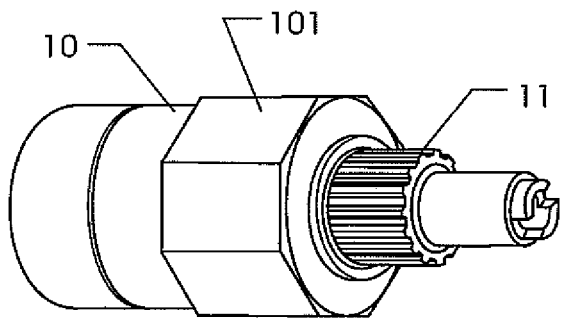
FIG. 4 shows the left output ring in the first embodiment of the present invention.
Figure 5:
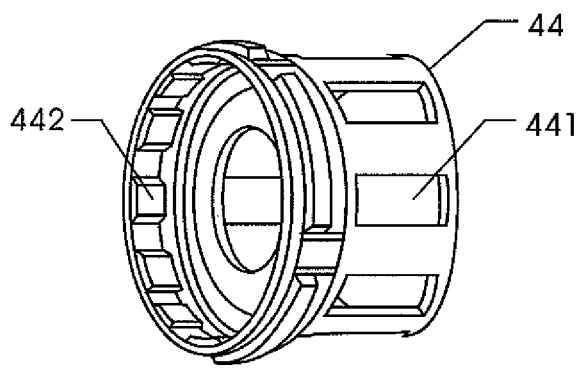
FIG. 5 shows the left rolling post retainer in a front end of the right output ring of the present invention.
Figure 6:
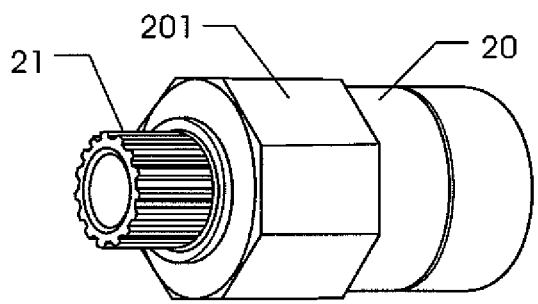
FIG. 6 shows the right output ring according to the first embodiment of the present invention.

With reference to FIGS. 1 and 2, the synchronous unit 5 has a left synchronous ring 51 and a right synchronous ring 52 which are combined together, but can rotate independently. The inner annular surfaces of the left synchronous ring 51 and right synchronous ring 52 are formed with teeth 511, 521, and outer annular surfaces thereof are formed with tilt teeth 522. However, another, it may be that the inner annular surfaces of the left synchronous ring 51 and right synchronous ring 52 are formed with tilt teeth 511, 521, and outer annular surfaces thereof are formed with teeth 512, 522.

Referring to FIGS. 1 to 7, the first embodiment of the present invention is illustrated. The left clutch unit 3 includes an left outer ring 31, a left middle ring 32, at least one rolling posts 33, a left rolling post retainer 34 at a front end of the left output ring 10 and the left output ring 10 with a cam. The right clutch unit 4 includes a right outer ring 41, a right middle ring 42, at least one rolling posts 43, a right rolling post retainer 44 installed at a front end of the right output ring 20; and the right output ring 20 with the cam. The left middle ring 32 and the right middle ring 42 are connected together by a bearing 6, but they are rotatable independently. An outer surface of the left middle ring 32 is formed with teeth 321 for engaging with left rolling post retainer 34 and an outer surface of the right middle ring 42 is formed with teeth 421 for engaging with the right rolling post retainer 44. An inner surface of the left middle ring 32 is formed with tilt teeth 322 for engaging with the outer tilt teeth 512 of the left synchronous ring 51; and an outer surface of the right middle ring 42 is formed with tilt teeth 422 for engaging with the outer tilt teeth 522 of the right synchronous ring 52.

With reference to FIGS. 1, 2, 3, and 4, the left output ring 10 is installed with a cam 101. The front end of the left output ring 10 is assembled with the left rolling post retainer 34. An annular wall of the left rolling post retainer 34 is formed with at least one penetrating notch 341 for receiving the rolling posts 33. An inner annular wall at a front end of the left rolling post retainer 34 is formed with teeth 342 for engaging with the teeth 321 at an outer annular surface of the left middle ring 32. An outer side at a front end of the left output ring 10 is installed with teeth 11 for engaging with inner annular teeth 511 of the left synchronous ring 51.

With reference to FIGS. 1, 2, 5 and 6, the right output ring 20 is installed with a cam 201. A front end of the right output ring 20 is assembled with a right rolling post retainer 44. An annular wall of the right rolling post retainer 44 is formed with at least one penetrating notch 441 for locating the rolling posts 43. An inner annular wall at a front end of the right rolling post retainer 44 is formed with teeth 442 for engaging the teeth 421 at the outer annular surface of the right middle ring 42. An outer side at a front end of the right output ring 20 is formed with a teeth 21 for engaging with the inner annular teeth 521 of the right synchronous ring 52.

Figure 7:
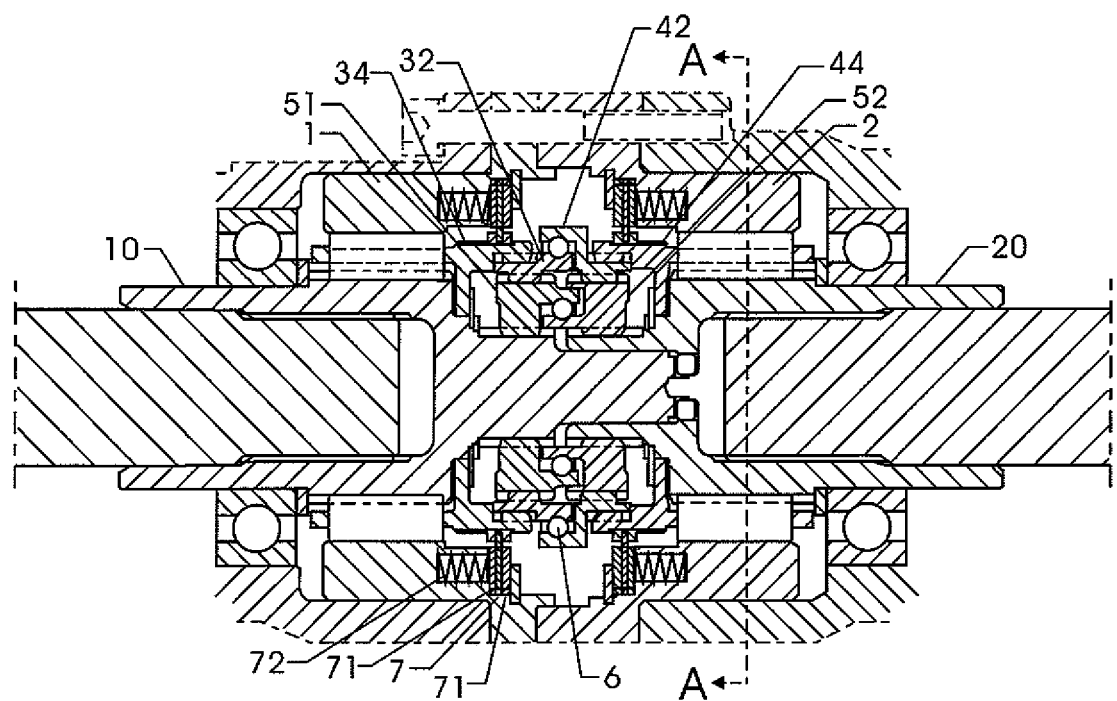
FIG. 7 is an enlarged cross sectional view about the double overrunning clutch device in the first embodiment of the present invention.

With reference to FIGS. 1, 2 and 7, a damping unit 7 is installed between the left outer ring 31 and the left rolling post retainer 34. Another damping unit 7 is installed between the right outer ring 41 and the right rolling post retainer 44. The damping units 7 are positioned and assembled between the left outer ring 31 and the left rolling post retainer 34 and between the right outer ring 41 and the right rolling post retainer 44. The damping unit 7 may be a friction sheet, a spring, or a magnetic element. In this embodiment, a friction sheet is used as an example and a spring 72 is also used to generate friction force.

With reference to FIGS. 16 to 21, the second embodiment of the present invention is illustrated. The second embodiment is identical to the first embodiment. The structure in the second embodiment has a left input unit 1, a left output ring 10 with a cam 101, a right input unit 2, a right output ring 20 with a cam 201, a double overrunning clutch device installed between the left input unit 1 and the left output ring 10 and between the right input unit 2 and the right output ring 20. The double overrunning clutch device includes a left clutch unit 3 and a right clutch unit 4. A synchronous unit 5 is installed between the left clutch unit 3 and the left output ring 10, and between the right clutch unit 4 and the right output ring 20. The difference between the first embodiment and the second embodiment is that the second embodiment has no left middle ring 32 and the right middle ring 42, but the second embodiment has identical function and effects as those illustrated in the first embodiment.

With reference to FIGS. 16 to 21, the left clutch unit 3 includes a left outer ring 31 and at least one rolling posts 33, a left rolling post retainer 34 at a front end of the left output ring 10, and the left output ring 10; the right clutch unit 4 includes a right outer ring 41, at least one rolling posts 43, a right rolling post retainer 44 at a front end of the right output ring 20 and the right output ring 20. An annular wall of the left rolling post retainer 34 is formed with at least one notch 341 for locating the rolling posts 33. An inner annular wall 343 at a front end of the left rolling post retainer 34 is formed with tilt teeth 343 for engaging with the outer annular tilt teeth 412 of a left synchronous ring 51 of a synchronous unit 5. An annular wall of the right rolling post retainer 44 is formed with at least one notch 441 for locating the rolling posts 43. An inner annular wall of the right rolling post retainer 44 is installed with tilt teeth 443 for engaging with an outer annular tilt teeth 522 of the right synchronous ring 52.

Figures 8, 9:
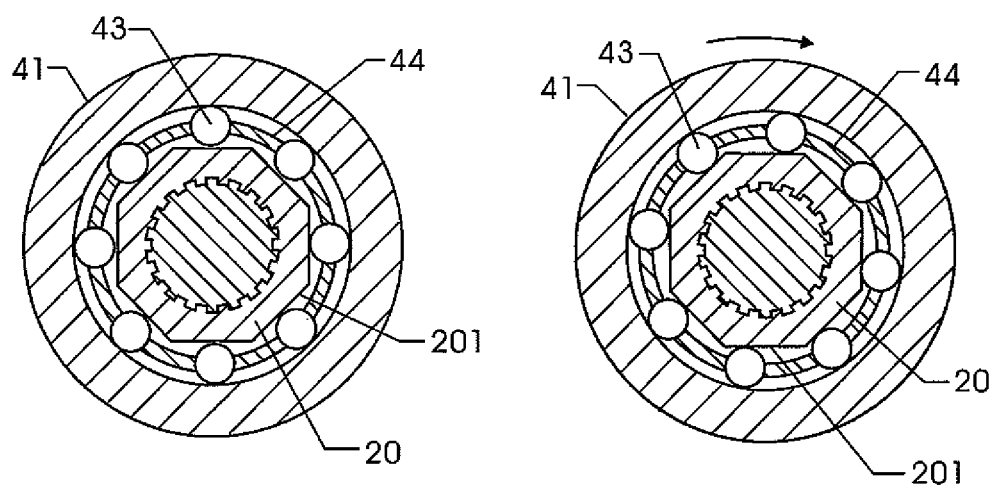
FIG. 8 is a cross sectional view along line A-A of FIG. 7.
FIG. 9 is a schematic view showing a forward moving state in two wheel driving according to FIG. 8.

With reference to FIGS. 8 to 15, the operations of the first and second embodiments of the present invention will be described herein. The structures and operations of the left clutch unit 3 and right clutch unit 4 are identical. In the following, the elements shown in the cross sectional view along line A-A shown in FIG. 8 are used for description. With reference to FIG. 8, when the right clutch unit 4 is in a free state, the right outer ring 41, at least one rolling posts 43, and the right rolling post retainer 44 at a front end of the right output ring 20 with a cam 201 are not operated, while the rolling posts 43 are not engaged.

With reference to FIG. 9, when two wheels move forwards synchronously, that is: the right clutch unit 4 moves forwards, the right outer ring 41 pushes the rolling posts 43 to a moving forward engaging position so that the right outer ring 41, the rolling posts 43 and the right output ring 20 with the cam 201 are at an engaging position to output power.

Figure 10:
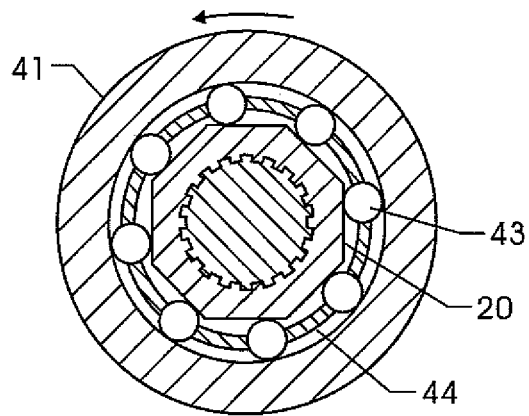
FIG. 10 is a schematic view showing a backward moving state in two wheel driving according to FIG. 8.

With reference to FIG. 10, when the two wheels move backwards synchronously, that is: the right clutch unit 4 moves backwards, the right outer ring 41 will push the rolling posts 43 to move to a backward engaging position so that the right outer ring 41, the rolling posts 43 and the right output ring 20 with the cam 201 engage each other to output backward power.

Figure 11:
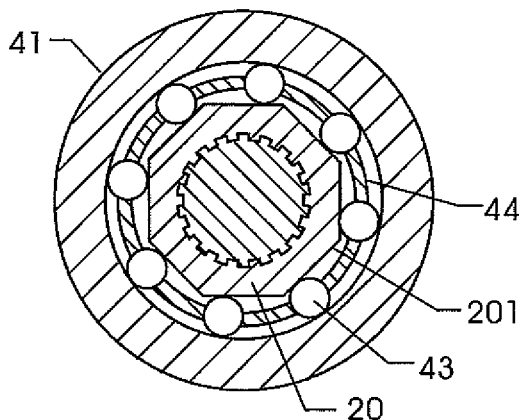
FIG. 11 is a schematic view in a forward moving state in two wheel different speed state in the structure shown in FIG. 8.
Figure 12:
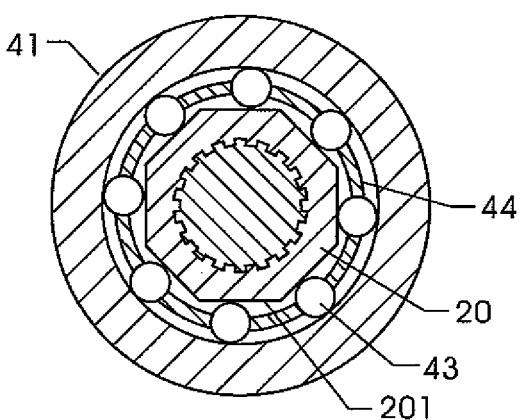
FIG. 12 is a schematic view showing that the rolling posts are separated due to quick speed of the output ring.
Figure 13:
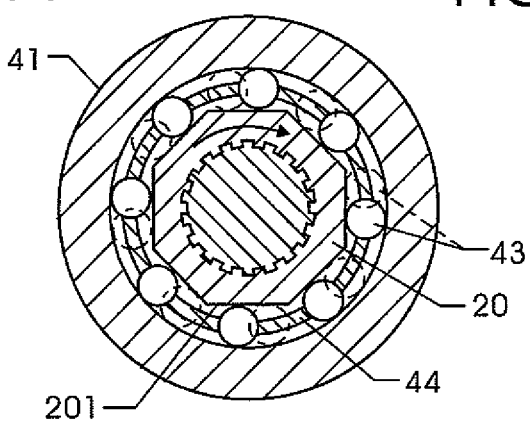
FIG. 13 is a schematic view showing to prevent the rolling post to move backward or to deadly lock according to the present invention.
Figure 14:
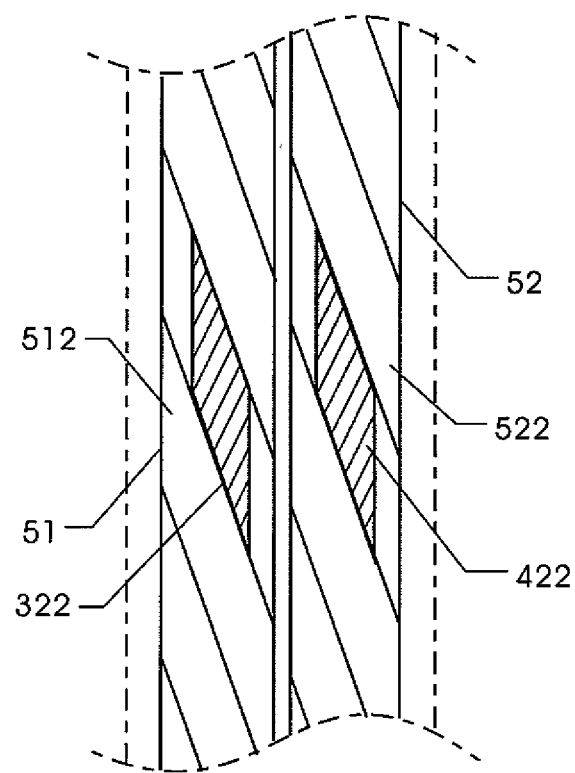
FIG. 14 is a schematic view showing that the synchronous unit is in a non-operation state according to embodiment of the present invention.
Figure 15:
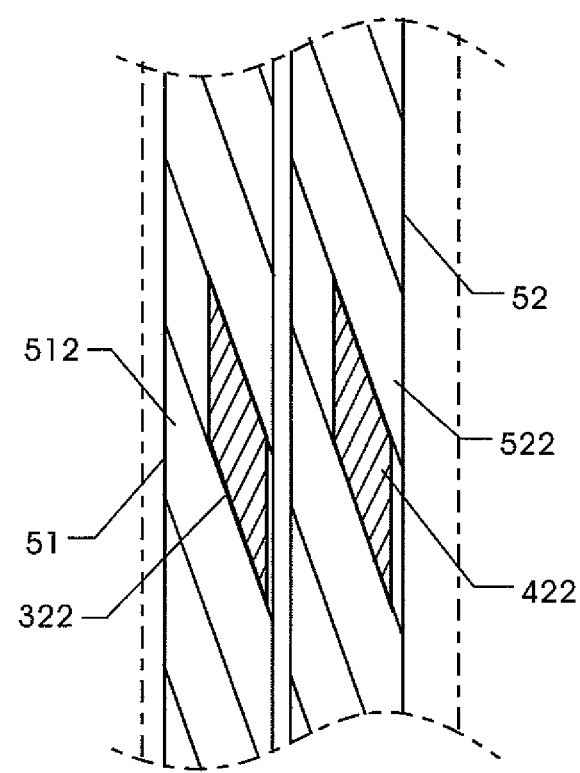
FIG. 15 is a schematic view showing that the synchronous unit is in a speed difference state according to the embodiment of the present invention.
Figure 16:
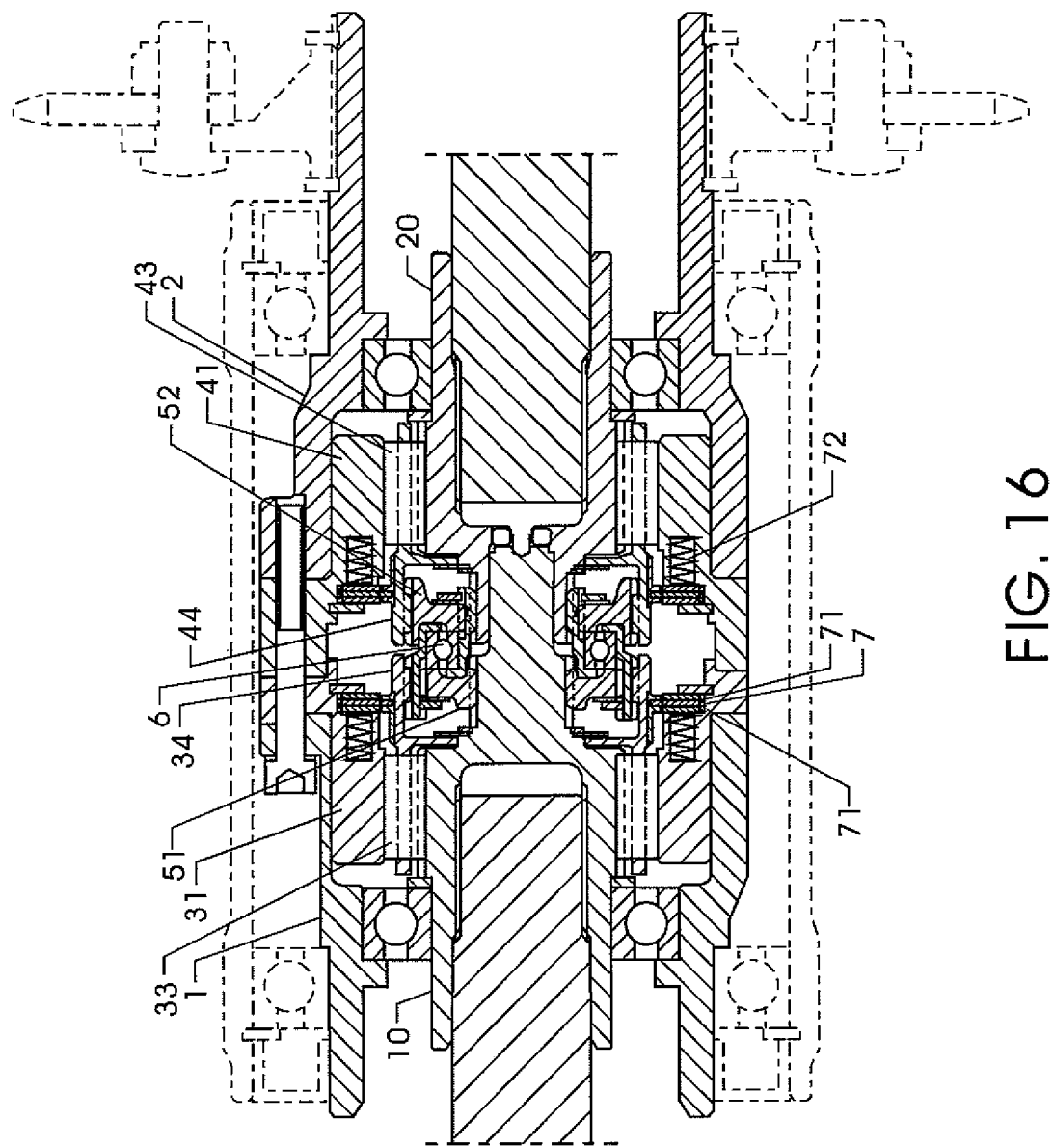
FIG. 16 shows the second embodiment of the present invention.
Figure 17:
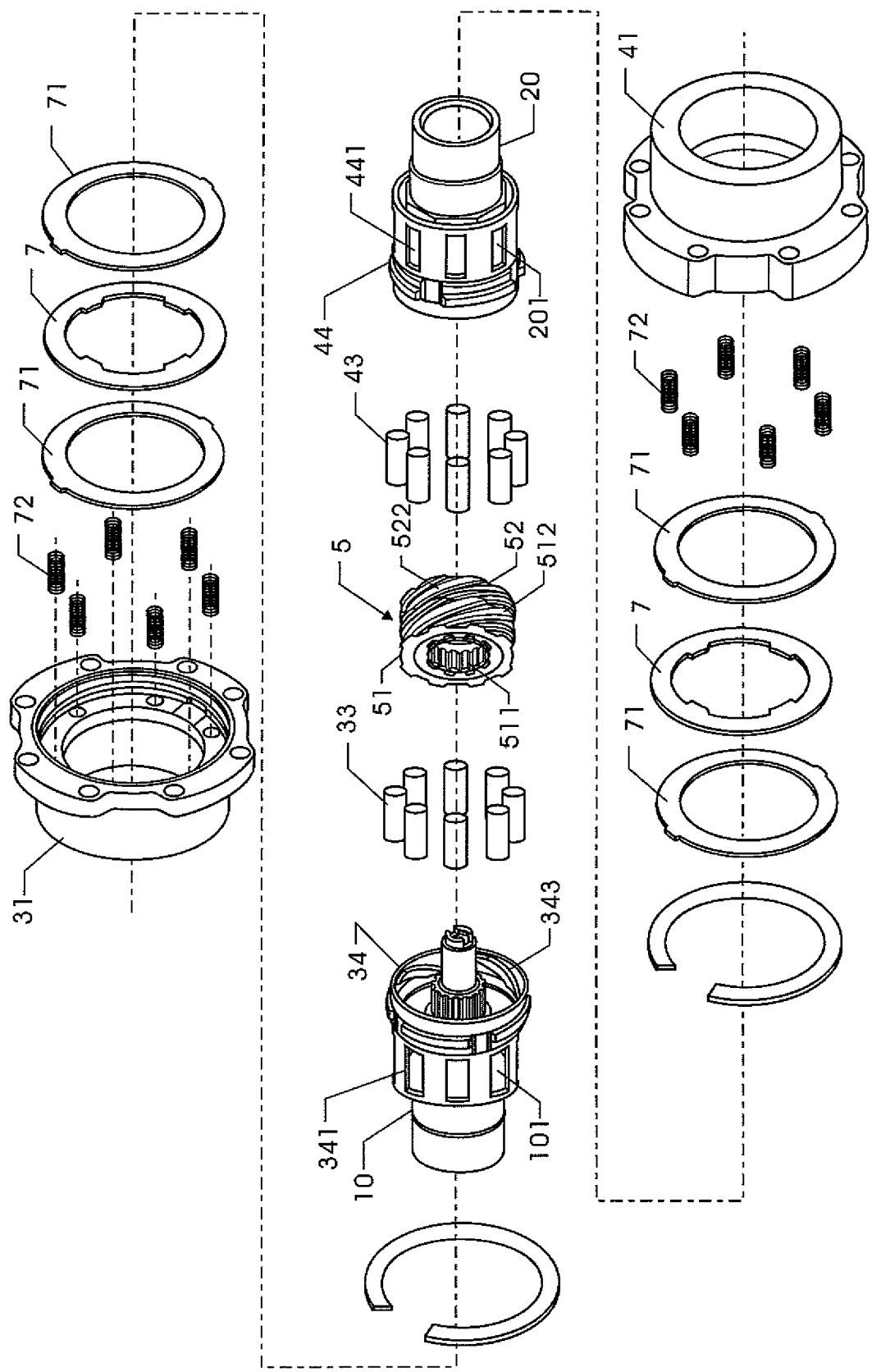
FIG. 17 shows an assembled schematic view about the double overrunning clutch device in the second embodiment of the present invention.
Figure 18:
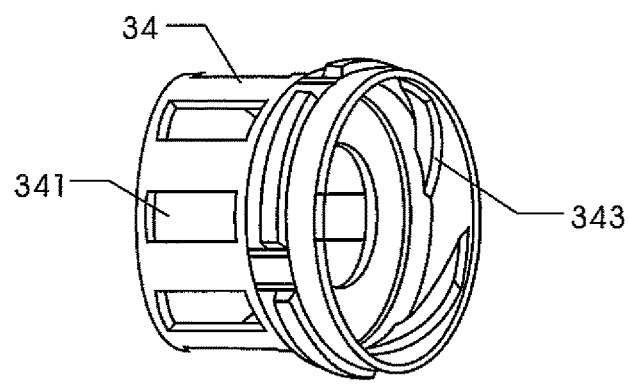
FIG. 18 shows the left rolling post retainer at a front end of the left output ring according to the second embodiment of the present invention.
Figure 19:
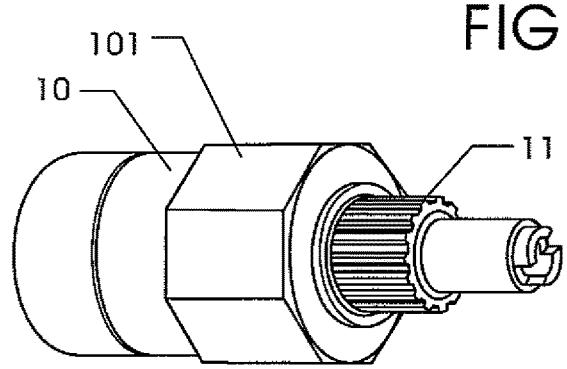
FIG. 19 shows the left output ring 10 according to the second embodiment of the present invention.
Figure 20:
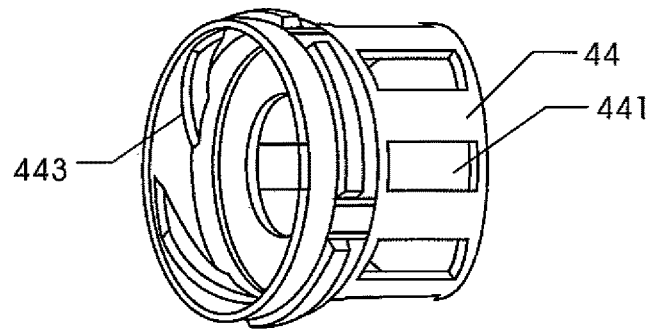
FIG. 20 shows the left rolling post retainer at a front end of the right output ring of the second embodiment of the present invention.
Figure 21:
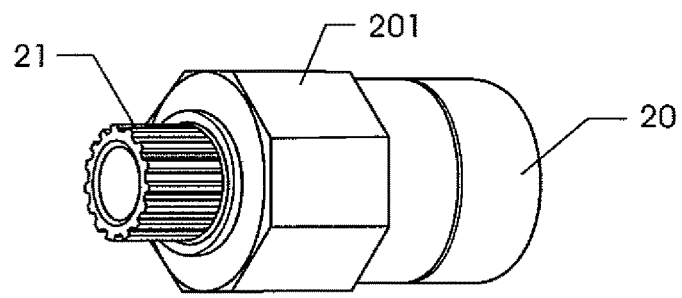
FIG. 21 shows the right output ring in the second embodiment of the present invention.

Referring to FIG. 11, when the two wheels move asynchronously to have speed difference, the right output ring 20 of the inner wheel is slower than the rotation speed of the engine of the right outer ring 41, the moving forward power of the inner wheel is driven by the right outer ring 41. The position sheet 71 operates with the right outer ring 41, and the spring 72 presses the positioning sheet 71 and the damping unit 7. Through the spring 72, the damping unit 7 has friction force. Because the damping unit 7 is in contact with the right rolling post retainer 44 so that the friction power is transferred to the right rolling post retainer 44. The right rolling post retainer 44 connecting the right middle ring 42 synchronously drives the right synchronous ring 52 of the synchronous unit 5 and the right output ring 20 with the cam 201 to rotate. At this moment, the right synchronous ring 52 does not operate. The right rolling post retainer 44 drives the rolling posts 43 so that the right outer ring 41, the rolling posts 43 and the right output ring 20 with the cam 201 to engage with each thus and thus to output power.

With reference to FIGS. 12, 13, 14 and 15, a schematic view showing the engagement state and speed differential state after assembly, in that the inner annular tilt teeth 422 of the right middle ring 42 and the outer annular tilt teeth 522 of the right synchronous ring 52 are not operated. When two wheels have no same speed to have speed difference, the rotation speed of the right output ring 20 of the outer wheel is greater and the right outer ring 41 is slower in rotation speed. The right middle ring 42 is connected to the right outer ring 41 so that the rotation speed of the right middle ring 42 is slower. The speed difference causes that the right synchronous ring 52 generates angular error and thus the inner annular tilt teeth 422 of the right middle ring 42 is deadly buckled to the outer annular tilt teeth 522 to enforce the right rolling post retainer 44 not to rotate along an opposite direction to a backward position so that the rolling posts 43 are pushed away. Therefore, the object of preventing the rolling posts 43 from a backward engaging position is achieved.

In summary, in the present invention, since the synchronous unit 5 installed between the left outer ring 31 and the right outer ring 41, the damping unit 7 installed between the right outer ring 41 and the left rolling post retainer 34 installed at a front end of the left output ring 10, the damping unit 7 installed between the right outer ring 41 and the right rolling post retainer 44, a double overrunning clutch device which can effectively increase the structural strength and bearing force is achieved. The speed differential device can prevent the double overrunning clutch device to deadly lock.

The speed differential device of the present invention can prevent the double overrunning clutch device from deadly locking. Especially, for a speed differential device with a cam installed on the output rings, the present invention can prevent the following status. The disposition of left and right rolling posts to cause that the wheels are locked can be prevented. The speed differential device with a cam can prevent that the speed differential device from being locked due to the transient acceleration, deceleration, and seed reduction in moving forwards and backwards of the speed differential device. Therefore, the double overrunning clutch device with a speed differential device according to the present invention provides a safety structure.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A speed differential device of a double overrunning clutch device, comprising:
    a left input unit (1),
    a left output ring (10) with a cam (101),
    a right input unit (2),
    a right output ring (20) with a cam (201); and
    a double overrunning clutch device between the left output ring (10) and the right output ring (20); and
    wherein the double overrunning clutch device includes a left clutch unit (3) and a right clutch unit (4); and a synchronous unit (5) is installed between the left clutch unit (3) and the left output ring (10), and between the right clutch unit (4) and the right output ring (20); and
    wherein the left clutch unit (3) includes an left outer ring (31), a left middle ring (32), at least one rolling post (33), a left rolling post retainer (34) at a front end of the left output ring (10) and the left output ring (101 with the cam (101); and the right clutch unit (4) includes a right outer ring (41), a right middle ring (42), at least one rolling post (43), a right rolling post retainer (44) installed at a front end of the right output ring (20); and the right output ring (20) with the cam (201); the left middle ring (32) and the right middle ring (42) are connected together by a bearing (6), but they are rotatable independently; an outer surface of the left middle ring (32) is formed with teeth (321) for engaging with left rolling post retainer (34) and an outer surfaces of the right middle ring (42) is formed with teeth (421) for engaging with the right rolling post retainer (44); an inner surface of the left middle ring (32) is formed with tilt teeth (322) for engaging with an outer tilt teeth (512) of a left synchronous ring (51); and an outer surfaces of the right middle ring (42) is formed with tilt teeth (422) for engaging with an outer tilt teeth (522) of a right synchronous ring (52).

2. The speed differential device of a double overrunning clutch device as claimed in claim 1, wherein the synchronous unit (5) has the left synchronous ring (51) and the right synchronous ring (52) which are combined together, but can rotate independently; an inner surface of each of the left synchronous ring (51) and the right synchronous ring (52) is formed with teeth or tilt teeth; and an outer annular surface of each of the left synchronous ring (51) and right synchronous ring (52) is formed with teeth or tilt teeth.

3. The speed differential device of a double overrunning clutch device as claimed in claim 1, wherein a damping unit (7) is installed between the left outer ring (31) and the left rolling post retainer (34); another damping unit (7) is installed between the right outer ring (41) and the right rolling post retainer (44); the damping units (7) are positioned and assembled between the left outer ring (31) and the left rolling post retainer (34) and between the right outer ring (41) and the right rolling post retainer (44).

4. The speed differential device of a double overrunning clutch device as claimed in claim 3, wherein the damping unit (7) is selected from one of a friction sheet, a spring, or a magnetic element.

5. The speed differential device of a double overrunning clutch device as claimed in claim 3, wherein an inner annular surface of the left middle ring (32) and an inner annular surface of the right middle ring (42) are formed with teeth.

* * * * *